Jan. 31, 1967   E. N. JACOBS   3,301,591
AUTO SEAT COVER WITH SUPPORT INSERTS
Filed April 29, 1965
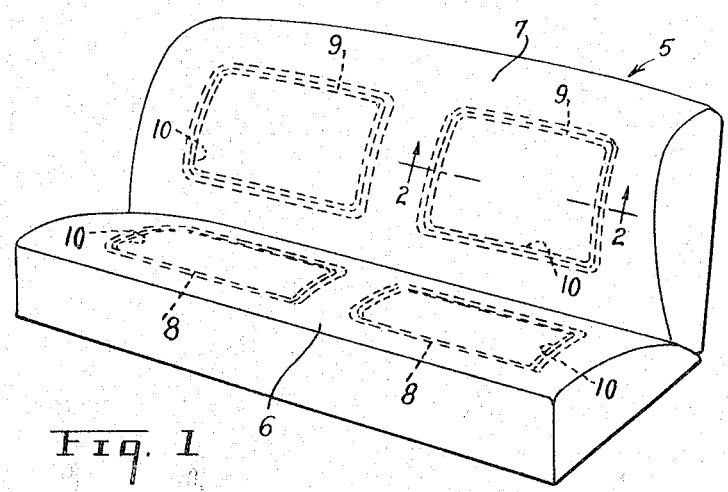
Fig. 1
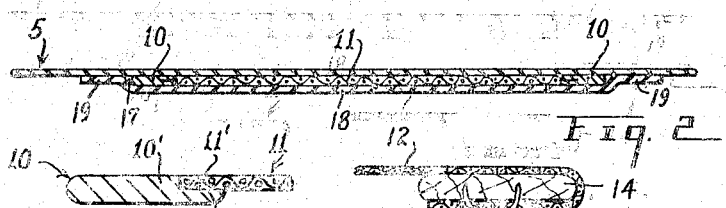
Fig. 2
Fig. 4   Fig. 5
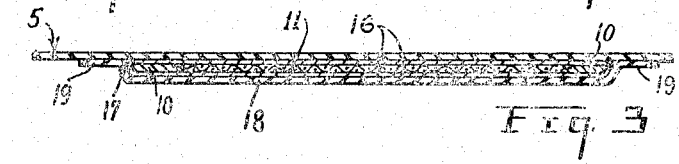
Fig. 3
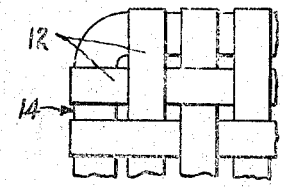
Fig. 6
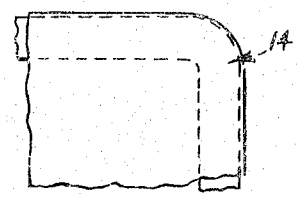
Fig. 6A
Fig. 7
INVENTOR
E. N. JACOBS
Fetherstonhaugh & Co.
ATTORNEYS

United States Patent Office 3,301,591
Patented Jan. 31, 1967

3,301,591
AUTO SEAT COVER WITH SUPPORT INSERTS
Edward N. Jacobs, 4552 Park Ave.,
Montreal, Quebec, Canada
Filed Apr. 29, 1965, Ser. No. 451,816
Claims priority, application Canada, Mar. 17, 1965,
925,891
2 Claims. (Cl. 297—219)

This invention relates to auto seat covers and particularly to the provision of support inserts in those portions of the cover which are most subject to heavy wear.

The invention consists essentially in the provision of a support element having a peripheral frame, of any desired shape, within which is secured a flexible body supporting member. This flexible body supporting member may take any well known form used in the upholstering trade, such as wire mesh, straps of fibre, leather, etc. stretched in crisscross fashion from the sides of the peripheral frame. The support element is secured on the under surface of the auto seat cover by a layer of material stitched or otherwise bonded to the under side of the auto seat cover around the periphery of the support element. In some cases, in order to provide a greater degree of comfort without reducing the amount of support provided, the support element may have a wrapping of fabric, foam rubber. The support element is located in the area of the seat cover normally occupied by the driver and/or passengers and additional support elements may be located in the area of the cover normally covering the back rest of the automobile seat. The latter support elements could be of lighter construction than those on the seat.

The object of the invention is to provide built-in body supports in auto seat covers.

A further object of the invention is to increase the wear-life of auto seat covers.

A further object of the invention is to provide a built-in support for auto seat covers having light weight and adding little to the thickness of the cover.

A further object of the invention is to provide built-in supports for auto seat covers which are located only in the locations where body weight is taken by the auto seat.

These and other objects of the invention will be apparent from the following detailed specification and accompanying drawings, in which:

FIG. 1 is a perspective front elevation of an automobile seat covered by a seat cover incorporating body support elements according to the present invention.

FIG. 2 is a cross section on the line 2—2 of FIG. 1 showing a body support element incorporated in a pocket on the under side of the seat cover.

FIG. 3 is a cross section similar to FIG. 2 but showing the body support element wrapped in a protective covering.

FIG. 4 is an enlarged transverse section of a portion of the body support element shown in FIG. 2.

FIG. 5 is a view similar to FIG. 4 but showing a strip of fabric secured to the rim of the body support element.

FIG. 6 is a partial plan view of a body support element using strips of fabric to provide the support.

FIG. 6A is a partial plan view similar to FIG. 6 but showing sheet material stretched on the frame.

FIG. 7 is an enlarged partial cross section similar to FIG. 2 in which the body supporting element is secured directly to the underside of the seat cover, by a covering sheet.

Referring to the drawings the auto seat cover 5 is shown in outline in FIG. 1 as it would be applied to an auto seat, and has a seat portion 6 and a back portion 7. Illustrated is a double seat cover. However, it is understood that the invention could be applied to single seats, such as bucket seats.

Body support members 8 are located in pockets on the under side of the seat portion 6 of the cover 5 and similar back support members 9 are supported in pockets on the rear side of the back portion 7 of the cover.

The support members 8 and 9 are of similar construction except that the members 9 may be of lighter construction than the members 8 because of the lesser load they have to support.

Each member 8 and 9 consists of a rigid rim defining frame 10 here shown as being of rectangular shape. However, it is to be understood that these frames 10 may be oval or any other desirable shape and may be bent to a contour shape to suit the contour shape of the seat over which the cover 5 is fitted, as seen in FIG. 1.

The frames 10 are relatively thin in vertical section and may be made of any suitable material such as steel, wood or plastic. A weight supporting element 11 is stretched between the side members 10' of the frame 10. This supporting element 11 may be of wire or plastic mesh as shown in FIGS. 2, 3 or 4 or may be of strips of natural or synthetic fabric 12 as shown in FIGS. 5 and 6, or may be sheet material such as metal, plastic or synthetic or natural fabrics as shown in FIG. 6A.

Where the frame 10 is of metal and the wire mesh 11 is of metal, a suitable method of securing the mesh 11 to the frame would be to have the top surface undercut as at 13 around the inner peripheral edge of the frame. The edges 11' of the mesh 11 could then be welded in the recess of the frame, or be secured in any other suitable manner. Should the mesh 11 be synthetic plastic then the frame 10 could be of plastic and the mesh 11 bonded in the recess 13 by heat and pressure.

In FIGS. 5 and 6 fabric straps 12 are shown secured to the frame 14. In this case the frame is preferably of wood or pressed wood fibres and the straps 12 could be wrapped around the outer peripheral edges of the frame and be secured by the staples 15.

In FIG. 3 the body support members 8 or 9 is shown wrapped in a layer of a cushioning material 16 such as foam rubber, felt or other like cushioning material.

The body support members 8 and 9 are held in position on the under side of the seat cover 5 within a pocket 17 formed by the enclosing sheet 18 which is secured around its peripheral edges 19 in suitable manner. If the cover 5 and sheet 18 are of plastic the peripheral edges 19 can be bonded by heat and pressure and, if the cover and sheet are of a textile fabric material the peripheral edges could be secured by stitching in well known manner.

In FIG. 7 the use of a rim frame carrying the body support element 11 is eliminated. In this modification the body support element 11 is secured directly to the seat cover 5 and to the cover sheet 18'. This modification has the advantage that there is greater flexibility in the seat, for instance, if three passengers were seated on a seat normally designed to seat two passengers.

By incorporating body supporting members directly into the seat covers, the user can obtain all the additional support he requires without the use of separate supports which, while they perform a very useful purpose, have to be placed in the correct position to suit the user and have a habit of slipping out of position when the user rises off the seat.

The size and shape of the supporting members can be designed to suit normal or heavy users and the weight supporting capacity of the seat members and the back rest members will differ to the degree that the pressure on the seat is very much higher than on the back rest.

What I claim is:

1. An automobile seat cover of the custom made type adapted to be fitted over the seat and back rest portions of the automobile seat as a protection therefor, substantially rectangular sheet members secured at their peripheral edges to predetermined areas of the unexposed under surface of the seat cover corresponding to the normal seat and back rest portions of the automobile seat taken by a passenger seated thereon, the said rectangular sheets forming pockets, and an orthopedic body supporting member fitted in each of the said pockets of the seat cover, the said body supporting members each comprising a rectangular frame bent to conform to the surface contour of the underlying seat and back rest portions of the automobile seat, a flexible body supporting structure secured at its peripheral edges in each of the said rectangular frames, and a layer of cushioning material wrapped about each of the said rectangular frames and flexible body supporting structures.

2. An auto seat cover as set forth in claim 1 in which the said rim defining frame has its inner peripheral edge recessed on one face and the said flexible body weight supporting structure is secured in the said recess.

References Cited by the Examiner

UNITED STATES PATENTS

| | | | |
|---|---|---|---|
| 54,314 | 5/1866 | Farmer | 297—452 |
| 770,973 | 9/1904 | Lippert | 297—219 |
| 1,418,940 | 6/1922 | Kutschmar | 297—218 |
| 1,659,405 | 2/1928 | Love | 297—457 |
| 1,884,270 | 10/1932 | Rylander | 5—354 |
| 1,999,560 | 4/1935 | Brueckl | 297—253 |
| 2,040,463 | 5/1936 | Brueckl | 297—253 |
| 2,627,303 | 2/1953 | Bard | 297—223 |
| 2,864,438 | 12/1958 | Levine | 297—456 |
| 3,099,483 | 7/1963 | Hofberg | 297—219 |
| 3,205,008 | 9/1965 | Murray | 297—452 |
| 3,208,085 | 9/1965 | Grimshaw | 297—452 |

FOREIGN PATENTS

| | | |
|---|---|---|
| 13,403/28 | 2/1929 | Australia. |
| 1,145,473 | 5/1957 | France. |
| 324,947 | 2/1930 | Great Britain. |
| 296,304 | 4/1954 | Switzerland. |

FRANK B. SHERRY, *Primary Examiner.*

FRANCIS K. ZUGEL, *Examiner.*